May 6, 1924.

G. W. LEIMAN

SHAFT PACKING

Original Filed Dec. 23, 1919

1,493,045

Inventor:-
George W. Leiman
by attorneys

Patented May 6, 1924.

1,493,045

UNITED STATES PATENT OFFICE.

GEORGE W. LEIMAN, OF NEWARK, NEW JERSEY, ASSIGNOR TO LEIMAN BROS., OF NEW YORK, N. Y., A COPARTNERSHIP COMPOSED OF WILLIAM H. LEIMAN, GEORGE W. LEIMAN, GUSTAVE A. LEIMAN, EDWARD C. LEIMAN, AND JOHN LEIMAN.

SHAFT PACKING.

Original application filed December 23, 1919, Serial No. 346,904. Divided and this application filed August 10, 1921. Serial No. 491,233.

*To all whom it may concern:*

Be it known that I, GEORGE W. LEIMAN, a citizen of the United States, and resident of Newark, the county of Essex and State of New Jersey, have invented a new and useful Improvement in Shaft Packing, of which the following is a specification.

This invention relates to rotary pumps and more particularly to the packing of the shaft of the pump, the object being to provide a packing which is simple, effective and durable.

Another object is to provide a packing for the shafts of rotary pumps having a plurality of disks, one of said disks being conical and arranged to engage a conical seat in the cylinder head of the pump.

Another object is to provide a shaft packing for rotary pumps having a plurality of disks, an elastic packing interposed between certain of said disks, and a yielding element between the piston and the disks for holding the device on its seat.

A still further object is to provide certain improvements in the form, construction and arrangement of the parts whereby the above named and other objects may be effectively attained.

A practical embodiment of my invention is represented in the accompanying drawings, in which—

Figure 1:
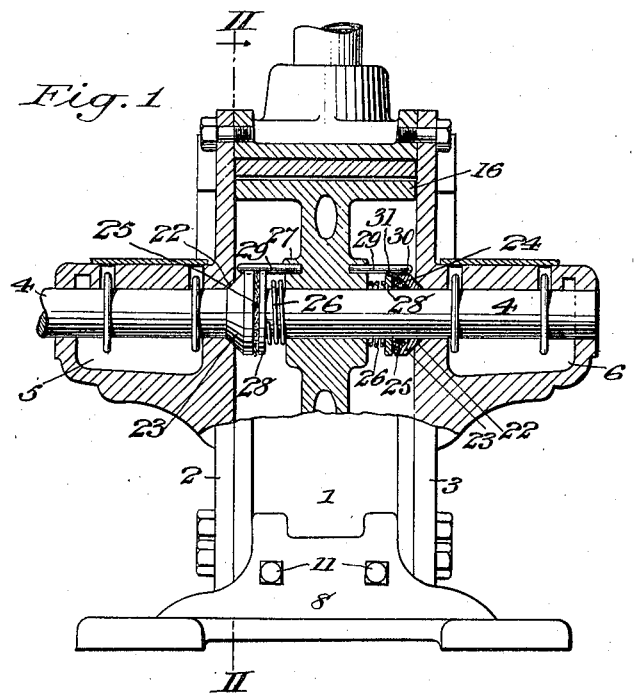
Figure 2:
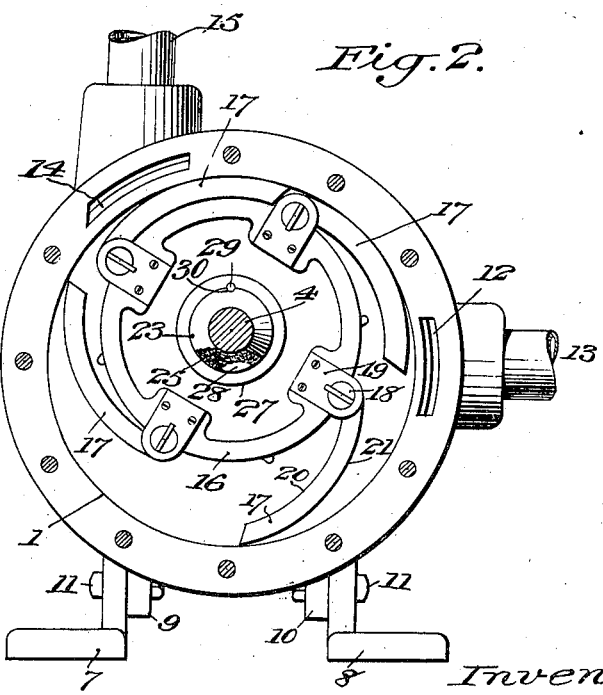

Fig. 1 represents an end elevation, partly in section, of a rotary pump having my improved shaft packing in position thereon, and Fig. 2 represents a vertical section taken in the plane of the line II—II of Fig. 1, looking in the direction of the arrows.

The cylinder is denoted by 1 and its heads by 2 and 3. A shaft 4 extends eccentrically through the cylinder 1 passing through the heads 2 and 3 and through suitable bearings in the oil receptacles 5 and 6 connected to or formed integral with the outer face of the cylinder heads 2 and 3. The cylinder is supported on brackets 7 and 8 secured to lugs 9 and 10, depending from the cylinder, by bolts 11, through which brackets the pump may be bolted to the floor or other suitable support.

The cylinder 1 is provided, in its peripheral wall, with an inlet port 12 with which an inlet pipe 13 communicates.

The cylinder is also provided, in its peripheral wall, with an outlet port 14 which communicates with an outlet pipe 15.

A piston 16, of cylindrical form, is fixed on the shaft 4 and provided with vibrating wings 17, in the present instance four are shown, located a quadrants' distance apart. The wings are held in suitable sockets by means of pins 18 secured in brackets 19 carried by the piston 16. The wings 17 are quite similar to one another and consist of a curved plate, the curve 20 on the inner face of the plate corresponding to the curve of the periphery of the piston 16, and the curve 21 on the outer face of the plate, corresponding throughout the greater portion of the length of the plate to the curve of the interior of the cylinder, but sharpened or made more abrupt near the outer ends of the plate, so that when the central portion of the plate is in contact with the interior of the cylinder 1, the opposite ends of the plate will recede from the interior of the cylinder, as clearly indicated in Fig. 2.

To prevent the oil from being sucked from the oil receptacles 5, 6 through the shaft bearings to the interior of the cylinder, or the escape of air from within, I provide each of the inner walls of the heads 2 and 3 around the shaft with a beveled recess 22 for the reception of a disk 23 having its exterior face adjacent the cylinder head tapered and fitted to seat in the recess 22. The disk 23 is interiorly tapered, as shown at 24, and arranged to receive packing 25 yieldingly held in position by a spring 26 surrounding the shaft and interposed between the hub 27 of the piston 16 and a follower disk 28. The disk 23 and the follower disk 28 are held in a fixed relation with the piston by means of a pin 29 fast in the hub 27 and projecting outwardly into slots 30, 31 in the disk 23 and follower disk 28, respectively. Thus it will be seen that the beveled and follower disks are caused to rotate with the piston, allowed a lateral movement on the shaft 4, but yieldingly held with the beveled disk 23 seated in its beveled recess.

I am enabled by this beveled recess with its beveled disk to maintain a tight joint between the shaft and cylinder head, and by reason of the packing 25 being held in the recess 24 by the follower disk 28 and spring 26, to affect a tight joint between the shaft 4 and the beveled disk 23.

This application is a division of my co-pending application, Serial No. 346,904, filed December 23, 1919, now Patent Number 1,414,028, dated April 25, 1922.

It is obvious that various changes may be resorted to in the form, construction and arrangement of the several parts without departing from the spirit and scope of my invention; hence, I do not wish to be limited to the details herein shown and described except as they may be specifically included in the claims.

What I claim is:

1. In combination with a rotary pump having a piston, cylinder heads and a shaft journaled therein, of a plurality of disks laterally movable on said shaft, yielding packing disposed between said disks, certain of the disks being provided with beveled faces arranged to coact with the cylinder heads, and springs interposed between the piston and disks for holding the beveled disks in contact with the cylinder heads.

2. In combination with a rotary pump having a piston, cylinder heads provided with beveled recesses, a shaft journaled therein, of a plurality of disks laterally movable on said shaft, yielding packing disposed between said disks, certain of said disks being provided with beveled faces arranged to coact with the beveled recesses in the cylinder heads, and springs interposed between the piston and disks for holding the beveled disks in the recesses in the cylinder heads.

3. In combination with a rotary pump having a piston, cylinder heads provided with beveled recesses, a shaft journaled therein, of a plurality of disks on said shaft, packing disposed between said disks, certain of said disks being provided with beveled faces arranged to coact with the beveled recesses in the cylinder heads, springs interposed between the piston and disks for holding the beveled disks in the recesses in the cylinder heads, and means carried by the piston adapted to engage the disks for maintaining them in a relatively fixed position.

4. In combination with a rotary pump having a piston, cylinder heads provided with beveled recesses, a shaft journaled therein, of a plurality of disks on said shaft, packing disposed between said disks, certain of said disks being provided with beveled faces arranged to coact with the beveled recesses in the cylinder heads, springs interposed between the piston and disks for holding the beveled disks in the recesses in the cylinder heads, pins in said piston, said disks having slots arranged to receive said pins for maintaining them in a relatively fixed position with respect to the piston.

In testimony, that I claim the foregoing as my invention, I have signed my name this 15th day of July 1921.

GEORGE W. LEIMAN.